United States Patent [19]

Sehkar et al.

[11] Patent Number: 5,110,688
[45] Date of Patent: May 5, 1992

[54] DIELESS MICRO-PYRETIC MANUFACTURING TECHNIQUE FOR FABRICATING BEARING MATERIALS AND THE BEARING MATERIALS PRODUCED THEREBY

[75] Inventors: Jainagesh A. Sehkar; A. K. Bhattacharya; Hung P. Li, all of Cincinnati, Ohio

[73] Assignee: University of Cincinnati, Cincinnati, Ohio

[21] Appl. No.: 621,300

[22] Filed: Dec. 3, 1990

[51] Int. Cl.$^5$ ................................................ G22F 3/00
[52] U.S. Cl. ..................... 428/552; 75/231; 75/232; 75/233; 75/234; 75/235; 419/2; 419/9; 419/12; 419/14; 419/15; 419/16; 419/17; 419/19; 419/27; 419/28; 419/34; 419/38; 419/45
[58] Field of Search .............. 419/45, 2, 9, 12, 14, 419/15, 16, 17, 19, 27, 28, 34, 38; 428/552; 75/231-235

[56] References Cited

U.S. PATENT DOCUMENTS 4,946,643  8/1990  Dunmead et al. ................ 419/45
4,990,180  2/1991  Halverson et al. ................ 419/45

OTHER PUBLICATIONS

Yamada, S., et al., Application of the Self-Lubricating Sintered Material With a Metal Backing to Industrial Machinery, ASLE Proceedings, 3rd International Conference on Solid Lubrication, pp. 145-151, Aug. 7-10, 1984.

Plain Bearings, Chapter 1: Introduction to Cast Bronze Sleeve Bearings, Ref. Machinery's Handbook, 22nd Edition (date uncertain).

P/M Engineering Handbook, published by Eagle-Picher Bearings Plant, Kalamazoo, Mich. (date belived to be Apr., 1987).

The OILES Bearing, published by OILES America Corporation, St. Plymouth, Mich. (date uncertain).

Primary Examiner—Stephen J. Lechert, Jr.
Attorney, Agent, or Firm—Frost & Jacobs

[57] ABSTRACT

The present invention relates to a method of fabricating various types of bearing materials and the bearing materials produced thereby. The processes of the invention may be used to produce porous self-lubricating bearings, laminated composite bearings (babbitt bearings) and bearings for high temperature application. The processes of the invention involve the use of micropyretic synthesis to achieve bearing materials with improved bearing properties, including higher bearing capacity and toughness.

50 Claims, 3 Drawing Sheets

DIELESS MICRO-PYRETIC MANUFACTURING TECHNIQUE FOR FABRICATING BEARING MATERIALS AND THE BEARING MATERIALS PRODUCED THEREBY

The present invention relates to a method of fabricating various types of bearing materials and the bearing materials produced thereby.

Bearing materials are quite probably the most universally used machine elements used in civilization and are applied in a wide variety of engineering applications. They may be found in many sizes, shapes and configurations.

Cast bearing materials have been eclipsed by materials produced by the techniques of powder metalurgy (P/M). Powder metalurgy has advantages in material and manufacture not found in other metalworking processes. Besides performance under uncommon operating conditions (no oil), proven reliability, tailor-made properties, high precision, dependable reproducibility, and alloys impossible in molten form, users are spared capital investment in machines.

There is no excessive lead time, and it is not necessary to carry inventories of special bars or strips. The precision of P/M parts allows a high degree of automation and the corresponding economies.

Advances in tooling and design have produced precision impossible until only a few years ago. In addition, surface finish, strength, lubrication and corrosion resistance can be built into powder metallurgy components. This results in longer life, greater adaptability, better performance and thus enhanced value to the user.

Precise control is an important advantage and is unique to the P/M process. Starting with high-purity powder particles, all aspects of the creation of a P/M part can be accurately controlled. This permits wide variations in physical and mechanical properties, while assuring performance characteristics obtained by closely reproduced dimensions.

Although limitations exist, practically any desired metal, alloy or mixture of metals can be produced. This includes many combinations not available in wrought forms, and hard brittle materials such as carbides. Also, a single part can be made hard and dense in one area while being soft and porous in another. Powder metallurgy is ideal for the production of unusual or complex-shaped parts that are almost impossible or impractical to obtain by other methods. Parts can be produced in a wide range of shapes with irregularly shaped holes, eccentrics, flats, splines, counterbores and involute gears. Several parts can be combined into one and fasteners can become an integral element, thus lowering assembly cost and space.

Physical properties can be tailored to cover a wide spectrum from low density highly porous parts having a tensile strength as low as 10,000 psi to minimal porosity pieces having a tensile strength of 180,000 psi or more.

Powder metallurgy is economical because of the rapid mass production, reduction or elimination of subsequent machining, and little if any scrap loss.

Conventional powder metallurgy bearings can be made to hold from 10 to 40% of oil by volume, and supply additional lubrication to the bearing surface as heat expands the oil. The oil is reabsorbed on cooling, ready for use when needed. The lubrication is achieved by means of the controlled network of small pores in the P/M material. These can be with a variety of desired and appropriate lubricants, eliminating the need for a costly lubrication system.

The self-damping capability of P/M materials results in quieter operation and smoother action. This advantage is particularly important in such products as business machines. In addition, particularly in the case of copper-infiltrated toolholders, vibration and wear are minimized and closer tolerances maintained.

The maintenance of close tolerances and smooth finishes eliminates the need for machining and improves the quality and performance of many parts.

Powder metallurgy permits combining materials which cannot be produced in any other way. Unique material combinations include graphite bronze for oil-free bearings and copper-infiltrated sintered iron components for maximum strength and wear.

Mechanical components assembled or laminated from stampings are excellent candidates for powder metallurgy, eliminating scrap and assembly time.

Notwithstanding the above-described advantages, the existing P/M technology for producing such bearing materials involves the use of high temperature furnaces for sintering the powders. Current methods require the constituent powders to be mixed, pressed and then carefully sintered at high temperatures for a considerable length of time. This involves high energy expenditures and costs time required by the several process steps. Also, these sintering processes prohibit a greater freedom in the selection of constituent powders due to the limitations inherent in the sintering process. For example, it is not possible to make Pb-Sn-Cu bearings by powder metallurgy because of the low temperature of melting of the lead-tin eutectic.

The present invention allows one to obtain all of the above-described advantages while saving the energy used in high temperature furnaces and the time needed in the related processing steps. In addition, the processes of the present invention provides a product material having better properties, such as higher bearing capacity and toughness. All types of bearings such as plane bearings, roller bearings, linear bearings and other specialty bearings can be made by the technique.

Further advantages will become apparent to one of ordinary skill in light of the following disclosure.

SUMMARY OF THE INVENTION

The present invention comprises methods for producing different classes of bearing materials, and the materials produced by these generic methods. The bearing materials of the present invention may be used in a wide variety of bearings such as plain, flange, thrust, linear, sleeve and roller bearings, and any structural material having a bearing surface.

Three of the important classes of bearing materials to which the invention relates are (1) porous self-lubricating bearings, (2) laminated babbitt bearings, and (3) bearings suitable for high temperature applications. The process of the invention is described as applied to the production of these three generic bearing classes.

The methods of the present invention all use a micro-pyretic process. As used herein, a micro-pyretic process is a process in which internal heat is generated at well distributed points inside a green powder compact. The heat should be of such a magnitude that a sintered product is obtained. The process may involve propagation of a micro-pyretic front or the process may be initiated simultaneously at many points in the sample.

As used in the description of the invention herein, all percentages are given as percent by weight unless otherwise indicated.

A. Porous Self-Lubricating Bearings

Porous bearings are generally of a metal alloy structure containing a plurality of pores that communicate with the surface of the part and, preferably, with one another. The pores serve as storage for fluid lubricant which is drawn out during bearing operation by pumping action associated with the shearing movement of adjacent parts.

As applied to this bearing type the invention involves first the preparation of a combustible powder mixture capable of undergoing micro-pyretic synthesis. This mixture has three basic components: (a) at least one bearing component matrix powder, (b) at least one low friction coefficient material powder and (c) at least one combustible material powder. The powder mixture is compacted to the desired shape of the bearing material product and then ignited to initiate the micro-pyretic process which then proceeds spontaneously causing the bearing material to form.

The consistency and fineness of the various powders used in accordance with the present invention may be of any such quality so as to allow the powder mixture to be formed into the desired shape and density and to allow propagation of the micro-pyretic front.

The bearing component matrix powder may be selected from any material appropriate to the production of a bearing material matrix. Examples of such materials include copper, aluminum, iron, nickel, chromium, and mixtures and alloys thereof, such as bronze, superalloys, etc. The preferred bearing material is copper.

The low friction coefficient material may be selected from any material appropriate as a low friction coefficient additive. Examples of such materials include tin, carbon, graphite, $MoS_2$, $PbS$, and mixtures thereof. The preferred low friction coefficient material is tin for low temPerature applications and molybdenum disulphide for high temperature applications.

The combustible material powder used in accordance with the present invention may be selected from any appropriate materials which can be ignited and undergo combustion so as to cause micro-pyretic reaction to occur. Examples of such materials include lead, nickel, sulfur, molybdenum, titanium and boron; metallic aluminum, titanium dioxide, boric oxide; silicon and graphite; metallic aluminum, titanium dioxide, boric oxide and zirconium oxide; metallic aluminum, titanium dioxide, boric oxide, metallic niobium; metallic aluminum, titanium dioxide, boric oxide, aluminum oxide and zirconium oxide; titanium, boron, nickel and phosphorus; titanium and graphite; and mixtures thereof. The preferred combustible material powder is a mixture of titanium, carbon and boron. Preferred compositions of the above combustible material powders may be as follows: from about 65% to about 95% titanium and remainder boron; from about 35% to about 55% metallic aluminum, about 25% to about 35% titanium dioxide, and about 20% to about 30% boric oxide; from about 65% to about 75% silicon and the remainder graphite; from about 20% to about 30% metallic aluminum, about 20% to about 25% titanium dioxide, about 15% to about 25% boric oxide, and about 25% to about 30% zirconium oxide; from 20% to about 30% metallic aluminum, about 20% to about 25% titanium dioxide, about 15% to about 25% boric oxide and about 25% to about 35% metallic niobium; from about 20% to about 30% metallic aluminum, about 20% to about 25% titanium dioxide, about 15% to about 25% boric oxide, about 20% to about 25% aluminum oxide and about 3% to about 10% zirconium dioxide; about 30% titanium, about 20% boron, about 40% nickel and about 10% phosphorus; about 50% titanium and about 50% graphite; all percentages being by weight of the combustible material powder. Of these. the preferred composition is: from about 25% Ni, 10% Pb, 25% Mo, 40% sulfur.

It is preferred that the bearing component powder and the low friction coefficient material powder be combined as copper and tin respectively in the form of bronze, and that the combustible material powder be a mixture of titanium, boron, and carbon. In this embodiment, it is preferred that the copper to tin ratio be in the range of from about 60:40 to about 98:2, and preferably be 90:10. Also, it is preferred that the ratio of the titanium and boron or carbon, taken together, to the bronze is in the range of from about 70:30 to about 95:5 and preferably be about 20:10.

It is also preferred that the combustible powder mixture additionally comprise at least one die release agent which may be any such agent known and used in the art as, for example, zinc stearate.

The combustible powder mixture may also optionally contain other minor additives such as crystalline or amorphous graphite powders, sulfur powders, molybdenum powders, lead powders and mixtures thereof, etc. to enhance bearing properties.

The powders of the combustible powder mixture are first blended then compacted under controlled pressure. These compacts can be made in any desired shape. Typical pressures may be in the range of from about 5,000 to 15,000 lbs/sq. in. Compacts are then ejected from the die.

The compacts are then ignited by any method known in the art such as torch, arc, low flame heat source or an induction system, which causes a pyretic front to initiate and propagate through the combustible powder mixture or spontaneously heat the complete sample. As the ignition front travels locally between powders, the elements fuse, sinter and react and form an alloy matrix dispersed with fine ceramic phases and low friction constituents. The final product has porosity which can be controlled by adjusting the composition of the material and also by controlling the combustion pressure, powder size, etc. The porosity may be impregnated with oil or other lubricants.

Because of the careful selection of constituent phases, the matrix provides good friction property and the ceramic compositing phase provides higher bearing strength and toughness than those porous bearing materials made by the traditional sintering technique. One of the distinct advantages of the present invention is that the sintering step is totally eliminated, allowing a substantial saving of energy, time and capital expense.

Inert air reducing atmosphere may be provided such as Argon or flammable gas to enhance the surface proportions of the bearings. Further vacuum impregnation of oil, graphite or molydisulfide may be carried out as a standard practice.

B. Laminated Composite Bearings (Babbitt Bearing)

Laminated composite bearings or babbitt bearings generally comprise a bearing support material upon which a porous bearing component material is layered and which, in turn, is layered with a low friction coefficient material which is melted into the porous layer.

As applied to this bearing type, this invention involves first the selection of a bearing support material which may be any of the materials commonly known in the art. Examples of such bearing support materials include steel, cast iron and alloys and laminates thereof. The preferred bearing support material is copper coated steel strip.

The bearing support material is provided with a layer of combustible powder mixture capable of undergoing micro-pyretic synthesis. This combustible powder mixture comprises at least one bearing component powder and at least one combustible material powder.

The bearing component powder material may be of any appropriate material used in the production of laminated composite bearings, such as copper, nickel, chromium, iron, steel, aluminum, and mixtures and alloys thereof, such as bronze, superalloys, etc. The preferred bearing component powder is copper-nickel with a copper to nickel ratio of about 55:45.

The combustible material powder may be of any material as described with respect to the porous self-lubricating bearings described above. The preferred combustible material powder is a mixture of titanium and boron, preferably present in a quantity of about 10% to about 20% of the combustible powder mixture.

The combustible powder mixture is ignited by any of the ignition means described above so as to initiate a solid state micro-pyretic wave which propagates along the length of the strip or spontaneously heats the strip giving rise to a porous layer front on the bearing support material.

Finally, a low friction coefficient material is placed on the porous layer (e.g. by coating or spraying) and then heated to just above its melting point so that it flows into the pores and creates a relatively smooth layer on top to form the third basic integral layer of the composite. This low friction material may be placed prior to the initiation of micro-pyretic synthesis.

Prior to the application of the low friction coefficient material, intermediate rolling can be Provided to control the thickness of the two-layer composite and also to control the porosity.

Through this technology, the sintering step is again eliminated resulting in a substantial saving in the energy requirement. Depending on the heat generated, the bonding of the sintered layer and the backing is achieved during the micro-pyretic synthesis. Additionally, the production time is reduced. Such advantages lead to substantial savings in the capital cost because the impregnation furnace and sintering furnaces are not required. Further, vacuum impregnation of graphite molydisulfide or oil can be carried out as per standard practice.

C. Bearing Material High Temperature Applications

In relatively high temperature applications, such in general industrial bearing or aerospace bearings, where high speed is also involved, it is necessary for the bearing material to maintain low friction and resistance to premature scoring and corrosion failure. A class of new material compositions has been developed for the first time and bearing materials have been produced based on the new composition by using micro-pyretic synthesis, which effectively results in high temperature bearing materials with good bearing properties.

As applied to this bearing type, the invention involved first the preparation of a combustible powder mixture capable of undergoing micro-pyretic synthesis. The combustible powder mixture comprises at least one bearing component powder, at least one combustible material powder, and a powder containing molybdenum sulfide.

The bearing component material may be selected from any appropriate material used for the production of such bearings, including, for instance material such as copper, nickel, chromium, iron, aluminum, and mixtures and alloys thereof, such as bronze, superalloys, etc. and mixtures thereof.

As in the previous embodiments in the invention, the combustible material powder may be any material appropriate for the initiation and propagation of a micro-pyretic synthesis such as, for example, a mixture of titanium and boron.

In a preferred embodiment, the combustible powder mixture comprises about 40% to about 70% copper or nickel mixed with from about 20% to 45% of fine molybdenum sulfide powders and from about 10% to about 15% of a mixture of titanium and boron powder.

The combustible powder mixture is then compacted to any desired shape of the bearing to be formed.

After the ejection from the die, the compacted material is then ignited, such as by a torch or arc, low flame system, laser, etc., to initiate a controlled micro-pyretic front in the material.

For instance, a product resulting from the preferred embodiment described above is a composite having $TiB/TiB_2$ and $MoS_2$ dispersed through out a matrix of mainly copper or nickel or a copper-nickel alloy. This unique material has a low sliding friction due to the abundance of fine dispersed $MoS_2$ particles. Also the material has high temperature bearing strength due to the presence of hard $TiB/TiB_2$ phases. It also has considerable toughness due to ductile matrix phases enhanced by compositing. The compositing also provides high creep and scoring resistance, thus making this material a promising new candidate for high temperature bearing applications.

All of the above processes may be done in air or under controlled atmosphere. The surface finish is better when done in an atmosphere of flowing Argon gas.

After the process, further vacuum impregnation of molydisulfide, graphite or oil may be carried out as is the standard practice.

DETAIL DESCRIPTION OF THE PREFERRED EMBODIMENTS

The following examples represent examples of detailed descriptions of the embodiments of the invention. Detail working examples are included for each of the three bearing types described above.

A. Porous Self-Lubricating Bearings

Porous bearings are of a metal/alloy structure containing a multitude of pores that substantially connect with each other and also with the surface of the bearing part. These pores serve as storage for fluid lubricant to form a protective film against direct metal-to-metal contact.

Table 1 shows a variety of component make-ups of the combustible powder mixture as described above. The percents given in Table 1 are that of the total combustible powder mixture. Also included in Table 1 are proximate hardness values, in terms of the standard Vickers scale, and objective remarks.

TABLE 1

| | Sn % | Cu % | Ti—B % (Ti:B) | Hardness | Remark |
|---|---|---|---|---|---|
| 1 | — | 20% | 80% (95:5) | | coarse Cu |
| 2 | — | 20% | 80% (95:5) | ~168.4 Hv | fine Cu (~3μ) |
| 3 | — | 20% | 80% (95:5) | | foam, coarse Cu |
| 4 | 9% | 81% | 10% (70:30) | ~36.5 Hv | Bronze (Sn:Cu = 1:9) |
| 5 | 8% | 72% | 20% (70:30) | ~284.6 Hv | Bronze (Sn:Cu = 1:9) |

Figure 1:
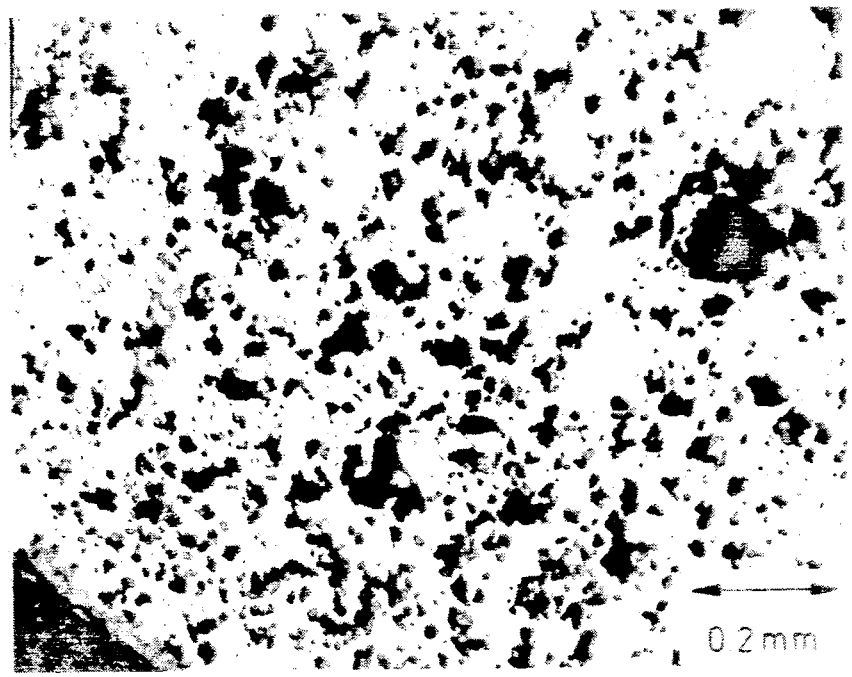
FIG. 1 is a photomicrograph of a composition prepared in accordance with one embodiment of the invention.
Figure 2:
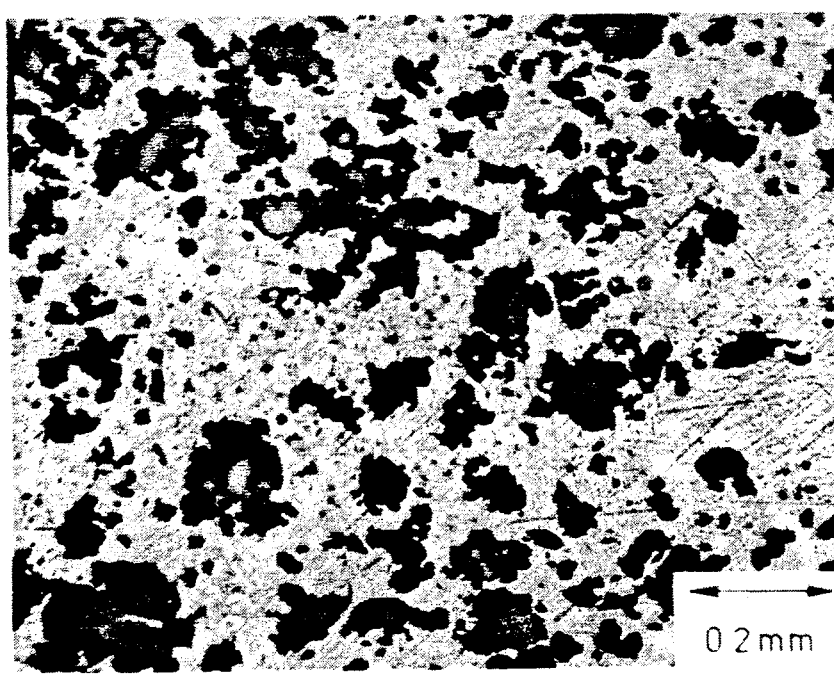
FIG. 2 is a photomicrograph of a composition prepared in accordance with one embodiment of the invention.
Figure 3:
FIG. 3 is a photomicrograph of a composition prepared in accordance with one embodiment of the invention.

FIGS. 1-3 show the microstructure of compositions 2, 3 and 4 of Table 1 respectively. From FIGS. 1 and 2, it can be seen that the particle size of the copper does not affect the size of pores and the porosity of the product. In composition 3 of Table 1, foam is added to increase initial porosity. Significant differences with and without foam have not been noted.

In the bronze compositions (compositions 4 and 5 of Table 1), FIG. 3 (representing composition 4 of Table 1) shows that the size of the pores is larger and porosity is less when compared to the other Ti-B-Cu compositions (i.e., compositions 1-3 of Table 1).

B. Laminated Composite Bearings (Babbitt Bearings)

Figure 4:
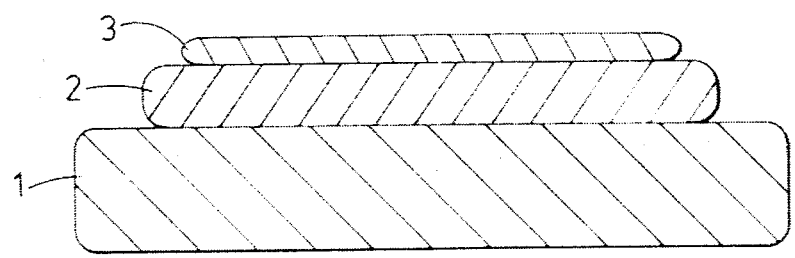
FIG. 4 is a schematic showing a layered composite babbit bearing in accordance with one embodiment of the invention.

Examples of the laminated bearings in this case of a number of copper-based alloy supported by steel reinforcement as shown in FIG. 4. FIG. 4 shows a steel reinforcement layer 1 and the porous layer 2 which contains TiB/TiB$_2$ ceramic or other intermetallic compounds (e.g. Ti-Cu). As pointed out above, this layer is formed by a micro-pyretic synthesis which occurs by the ignition of a combustible powder mixture of Cu-Ni (55:45 and TiB powder).

Three compounds of the combustible powder mixture as shown in Table 2, were tested. The percentages given in Table 2 reflect the percentages of the individual components in the combustible powder mixture.

TABLE 2

| | Cu:Ni = 55:45 | Ti:B = 70:30 | Remark |
|---|---|---|---|
| 1 | 90% | 10% | |
| 2 | 85% | 15% | better |
| 3 | 80% | 20% | |

All of the samples representing compositions 1-3 in Table 2 were found not to break after rolling. Also, the 15% Ti-B composition was found to perform somewhat better than the other samples. Composition 1 of Table 2 (i.e., containing 10% Ti-B) was found to need torch assistance to maintain the micro-pyretic front wave propagating. Composition 3 of Table 2 (i.e., contain 20% Ti-B) was found to react somewhat more violently and resulted in numerous pores being formed.

The hardness of the cross section and longitudinal section of composition 2 of Table 2 were found to be 32.9 ±4.0 Hv and 23.7 ±4.5 Hv. The hardness of the longitudinal section enhanced to 281.5 ±35.6 Hv after not rolling.

FIG. 4 also shows the position of the tine coating 3 which is melted into porous layer 2 atop steel reinforcement layer 1. A typical dimensions for layers 1-3 were as follows:

the steel reinforcement layer (2-3 millimeters),
the porous layer (2 millimeters), and
the tin layer (0.25-0.5 millimeters).

C. Bearing Material For High Temperature Application

As examples of bearing material for high temperature application in accordance with the third type of bearing described above, Table 3 shows different combinations of the bearing component material (i.e., copper and/or nickel), the combustible material powder (i.e., Titanium-Boron), and percentage amounts of the molybdenum sulfide low friction co-efficient material.

High contents of copper or nickel are used to enhance the toughness of the bearing. The molybdenum sulfide, having a very low co-efficient of friction (i.e., 0.04) gives the material good bearing quality. The Ti-B mixture can give not only sufficient energy to center the green simple, but also the Ti/TiB$_2$ phases can strengthen the matrix.

TABLE 3

| | MoS$_2$ | Metallic Phases | | Ti:B | Remark |
| | | Ni | Cu | % (Ti:B) | |
|---|---|---|---|---|---|
| 1 | 40% | 35% | — | 20% (80:20) | Sound |
| 2 | 45% | 45% | — | 10% (70:30) | Sound |
| 3 | 30% | 50% | — | 20% (70:30) | Sound |
| 4 | 45% | 40% | — | 15% (70:30) | Sound |
| 5 | 30% | — | 50% | 20% (70:30) | Sound |

Figure 5:
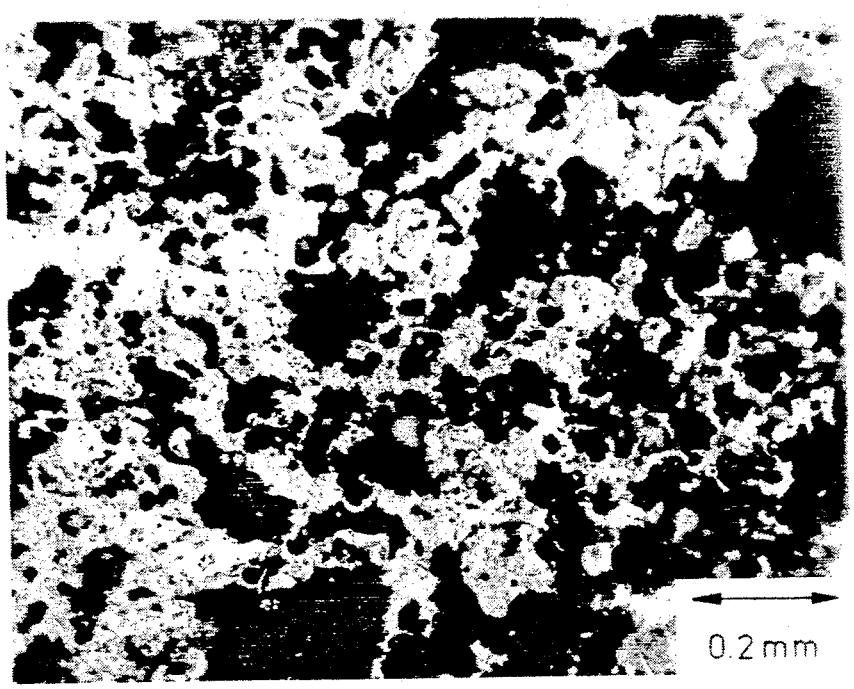
FIG. 5 is a photomicrograph of a composition prepared in accordance with one embodiment of the invention.

The hardness of the molybdenum sulfide phase is about 12 Hv and that of the nickel and copper matrices are about 25 and 35 Hv respectively. FIG. 5 shows the morphology of composition 5 of Table 3 (i e.. the MoS$_2$/Cu/Ti-B composition). The black area is the molybdenum sulfide phase, the grey and light parts are the Ti-B-Cu intermetallic compound and free Cu metallic phase, respectively.

Figure 6:
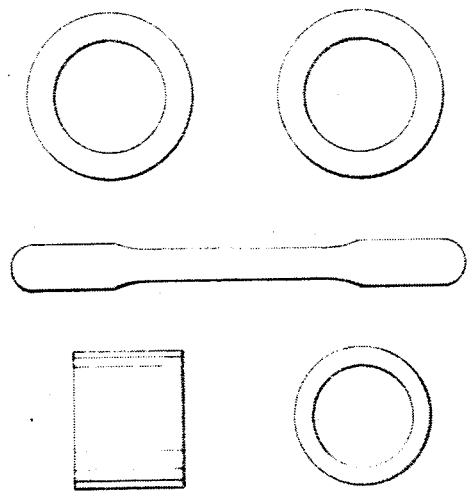
FIG. 6 is a photograph of several articles of manufacture prepared in accordance with the invention.

FIG. 6 shows a number of articles of manufacture prepared in accordance with the process of the invention.

In light of the foregoing disclosure, modifications, alterations and variations may be made and equivalent materials used, to an end the present invention without departing from its spirit.

What is claimed is:

1. A method of preparing a bearing material for use in a self-lubricating bearing, said method comprising:
    (1) preparing a combustible powder mixture capable of undergoing micro-pyretic synthesis, said mixture comprising:
        (a) at least one bearing component powder;
        (b) at least one low friction coefficient material powder; and
        (c) at least one combustible material powder;

(2) compressing said combustible powder mixture into a shape; and (3) igniting said combustible powder mixture and allowing said combustible powder mixture to undergo micro-pyretic synthesis for sufficient time so as to form said bearing material.

2. A method according to claim 1 wherein said at least one bearing component powder comprises a metal selected from the group consisting of copper, aluminum, iron, nickel, chromium, and mixtures and alloys thereof.

3. A method according to claim 2 wherein said metal is copper.

4. A method according to claim 1 wherein said at least one low friction coefficient material is selected from the group consisting of tin, carbon, graphite, molybdenum sulfide, lead sulfide and mixtures thereof.

5. A method according to claim 4 wherein said material is tin.

6. A method according to claim 1 wherein said at least one bearing component powder comprises copper and said at least one low friction coefficient material powder comprises tin, and wherein said copper and tin are present in the form of bronze.

7. A method according to claim 1 wherein said at least one bearing component powder comprises copper and said at least one low friction coefficient material powder comprises tin, wherein said copper and tin are present in the form of bronze, and wherein the ratio of copper to tin is in said bronze is in the range of from about 60:40 to about 98:2.

8. A method according to claim 7 wherein said ratio is 90:10.

9. A method according to claim 1 wherein said at least one combustible material powder comprises material selected from the group consisting of titanium and boron; metallic aluminum, titanium dioxide, boric oxide; silicon and graphite; metallic aluminum, titanium dioxide, boric oxide and zirconium oxide; metallic aluminum, titanium dioxide, boric oxide, metallic niobium; metallic aluminum, titanium dioxide, boric oxide, aluminum oxide and zirconium oxide; titanium, boron, nickel and phosphorus; titanium and graphite; and mixtures thereof.

10. A method according to claim 1 wherein said at least one combustible material powder comprises titanium and boron.

11. A method according to claim 1 wherein said at least one bearing component powder comprises copper and said at least low friction coefficient material powder comprises tin, wherein said copper and tin are present in the form of bronze, wherein said at least one combustible material comprises titanium and boron, and wherein the ratio of said titanium and said boron taken together to said bronze is in the range of from about 70:30 to about 95:5.

12. A method according to claim 11 wherein said ratio is about 20:10.

13. A method according to claim 1 wherein said combustible powder mixture additionally comprises at least one die release agent.

14. A method of preparing a babbitt bearing composite material, said method comprising:

(1) preparing a babbitt bearing support material with a combustible powder mixture capable of undergoing micro-pyretic synthesis, said mixture comprising:

(a) at least one bearing component powder; and (b) at least one combustible material powder; and (2) igniting said combustible powder mixture and allowing said combustible powder mixture to undergo micro-pyretic synthesis so as to form a porous layer on said bearing support material; and (3) melting at least one low friction coefficient material into said porous layer so as to produce said bearing composite material.

15. The method according to claim 14 wherein said babbitt bearing support material comprises a material selected from the group consisting of steel, cast iron and alloys and laminates thereof.

16. The method according to claim 15 wherein said material is copper-coated steel.

17. The method according to claim 14 wherein said bearing component powder comprises a metal selected from the group consisting of copper, nickel, aluminum, iron, chromium and mixtures and alloys thereof.

18. A method according to claim 14 wherein said bearing component powder comprises copper and nickel present in a ratio of about 55:45.

19. The method according to claim 14 wherein said at least one combustible material powder comprises a material selected from the group consisting of titanium and boron; metallic aluminum, titanium dioxide, boric oxide; silicon and graphite; metallic aluminum, titanium dioxide, boric oxide and zirconium oxide; metallic aluminum, titanium dioxide, boric oxide, metallic niobium; metallic aluminum, titanium dioxide, boric oxide, aluminum oxide and zirconium oxide; titanium, boron, nickel and phosphorus; titanium and graphite; and mixtures thereof.

20. The method according to claim 19 wherein said combustible material powder comprises titanium and boron.

21. The method according to claim 14 wherein said at least one combustible material comprises titanium and boron and wherein said titanium and boron taken together are present in an amount in the range from about 10% to about 20% of said combustible powder mixture.

22. The method according to claim 14 wherein said at least one low friction coefficient material comprises a material selected from the group consisting of tin, carbon, graphite, molybdenum sulfide, lead sulfide and mixtures thereof.

23. The method according to claim 22 wherein said at least one low friction coefficient material comprises tin powder and wherein said tin powder is provided to said porous layer in a thickness in a range of from about 0.25 millimeters to about 0.5 millimeters prior to melting in step (3).

24. The method according to claim 14 additionally comprising the step of rolling said porous layer prior to applying said at least one low friction coefficient material.

25. A method for preparing a bearing material comprising a bearing support material, for use in a high temperature bearing and the like, said method comprising:

(1) preparing a combustible powder mixture capable of undergoing micro-pyretic synthesis, said powder mixture comprising:

(a) at least one bearing component powder;

(b) at least one combustible material powder; and (c) a powder containing molybdenum sulfide powder;

(2) compacting said combustible powder mixture; and (3) igniting said combustible powder mixture and allowing said combustible powder mixture to undergo micro-pyretic synthesis so as to form said bearing material.

26. The method according to claim 25 wherein said at least one bearing component material powder comprises a material selected from the group consisting of copper, nickel, aluminum, iron, chromium and mixtures and alloys thereof.

27. The method according to claim 26 wherein said at least one bearing component powder comprises copper and nickel and wherein said at least one bearing component powder is present in an amount in the range of from about 32% to about 70% of said combustible powder mixture.

28. The method according to claim 25 wherein said combustible material powder comprises a material selected from the group consisting of titanium and boron; metallic aluminum, titanium dioxide, boric oxide; silicon and graphite; metallic aluminum, titanium dioxide, boric oxide and zirconium oxide; metallic aluminum, titanium dioxide, boric oxide, metallic niobium; metallic aluminum, titanium dioxide, boric oxide, aluminum oxide and zirconium oxide; titanium, boron, nickel and phosphorus; titanium and graphite; and mixtures thereof.

29. The method according to claim 28 wherein said combustible powder mixture comprises titanium and boron and wherein said titanium and boron taken together are present in an amount in the range of from about 20% to about 40% of said combustible powder mixture.

30. The method according to claim 25 wherein said molybdenum sulfide powder is present in an amount in the range of from about 20% to 45% of said combustible powder mixture.

31. The method according to claim 25 additionally comprising the step of rolling said bearing material.

32. A bearing material prepared in accordance with the method of claim 1.

33. A bearing material prepared in accordance with the method of claim 2.

34. A bearing material prepared in accordance with the method of claim 4.

35. A bearing material prepared in accordance with the method of claim 7.

36. A bearing material prepared in accordance with the method of claim 11.

37. A babbitt bearing composite prepared in accordance with the method of claim 14.

38. A babbitt bearing composite prepared in accordance with the method of claim 15.

39. A babbitt bearing composite prepared in accordance with the method of claim 17.

40. A babbitt bearing composite prepared in accordance with the method of claim 18.

41. A babbitt bearing composite prepared in accordance with the method of claim 19.

42. A babbitt bearing composite prepared in accordance with the method of claim 21.

43. A babbitt bearing composite prepared in accordance with the method of claim 22.

44. A babbitt bearing composite prepared in accordance with the method of claim 24.

45. A bearing material prepared in accordance with the method of claim 25.

46. A bearing material prepared in accordance with the method of claim 26.

47. A bearing material prepared in accordance with the method of claim 27.

48. A bearing material prepared in accordance with the method of claim 28.

49. A bearing material prepared in accordance with the method of claim 29.

50. A bearing material prepared in accordance with the method of claim 30.

* * * * *